United States Patent
Groenenboom

(10) Patent No.: US 12,083,412 B2
(45) Date of Patent: Sep. 10, 2024

(54) SKATEBOARD TRUCK MOUNT SKATEBOARD TRUCK MOUNT

(71) Applicant: Mark Groenenboom, Wyoming, MI (US)

(72) Inventor: Mark Groenenboom, Wyoming, MI (US)

(*) Notice: Subject to any disclaimer, the term of this patent is extended or adjusted under 35 U.S.C. 154(b) by 85 days.

(21) Appl. No.: 17/872,693

(22) Filed: Jul. 25, 2022

(65) Prior Publication Data
US 2024/0024760 A1  Jan. 25, 2024

(51) Int. Cl.
*A63C 17/01* (2006.01)
*B29C 70/06* (2006.01)
*B29K 307/04* (2006.01)
*B29K 309/08* (2006.01)
*B29L 31/52* (2006.01)

(52) U.S. Cl.
CPC .......... *A63C 17/017* (2013.01); *A63C 17/012* (2013.01); *B29C 70/06* (2013.01); *B29K 2307/04* (2013.01); *B29K 2309/08* (2013.01); *B29L 2031/52* (2013.01)

(58) Field of Classification Search
CPC ................ A63C 17/011; A63C 17/012; A63C 17/017; B29C 70/06
See application file for complete search history.

(56) References Cited

U.S. PATENT DOCUMENTS

| | | | |
|---|---|---|---|
| 4,515,379 A | 5/1985 | Pasques | |
| 7,303,199 B2 | 2/2007 | Chen | |
| 7,306,240 B2 | 12/2007 | Chen | |
| 7,837,204 B1 | 11/2010 | Groenenboom | |
| 7,896,364 B1* | 3/2011 | Ferreira | A63C 17/064 280/11.27 |
| 8,454,038 B2 | 4/2013 | O'Rourke | |
| 9,555,314 B2 | 1/2017 | Groenenboom | |
| 11,213,738 B1* | 1/2022 | Groenenboom | A63C 17/015 |
| 2002/0125670 A1* | 9/2002 | Stratton | A63C 17/01 280/87.041 |
| 2005/0051983 A1* | 3/2005 | Williams | A63C 17/01 280/11.27 |
| 2012/0146304 A1* | 6/2012 | Fehn | A63C 17/0046 29/525.01 |
| 2013/0175774 A1* | 7/2013 | Lininger, Jr. | A63C 17/0033 16/45 |
| 2015/0061252 A1* | 3/2015 | Lininger, Jr. | A63C 17/012 280/87.042 |
| 2020/0179791 A1* | 6/2020 | Williams, Jr. | A63C 17/015 |
| 2021/0213350 A1* | 7/2021 | Moronta Blanco | A63C 17/015 |
| 2022/0023745 A1* | 1/2022 | Liang | A63C 17/015 |

* cited by examiner

Primary Examiner — Brian L Swenson
(74) Attorney, Agent, or Firm — Robert A Pasic

(57) ABSTRACT

A truck mount for a skateboard which supports a skateboard truck is disclosed. The truck mount includes features that may be molded and include wheel clearance, stop features, and improved stiffness and load carrying ability. The mount includes a truck mount area, a board mount area, and a narrow area that connects the truck mount area with the board mount area. The truck mount area and the board mount area are vertically offset and the narrow area includes a stop feature.

19 Claims, 12 Drawing Sheets

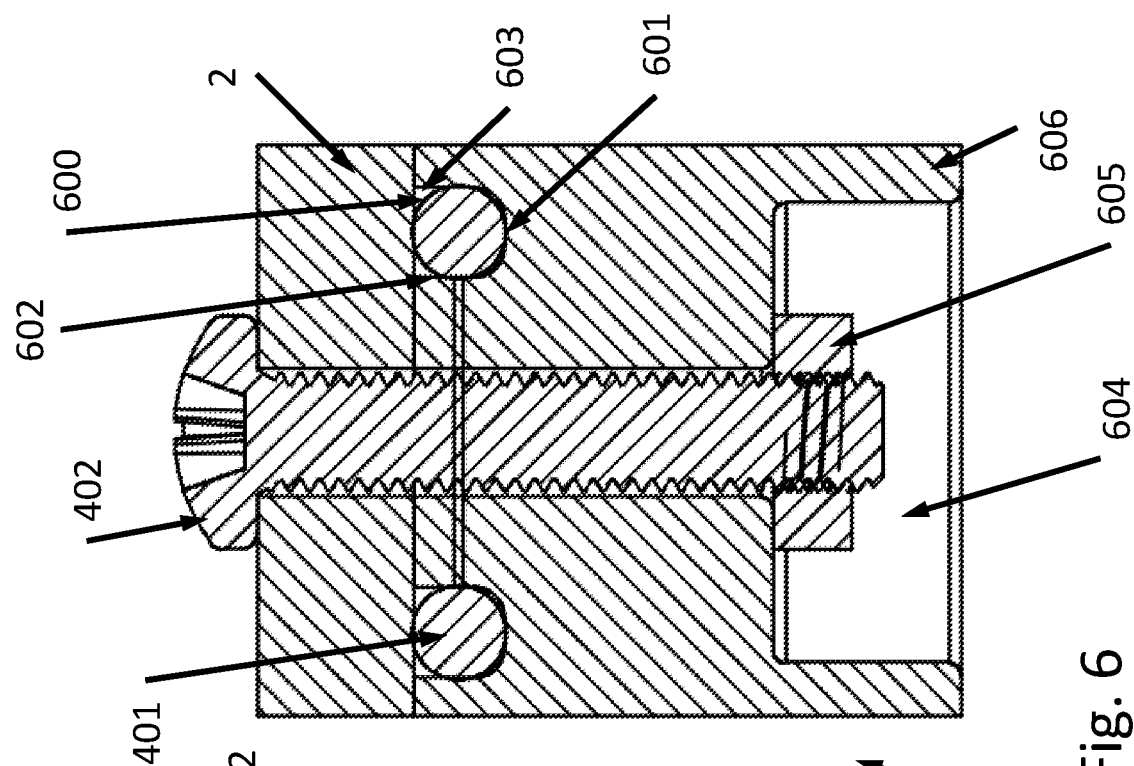
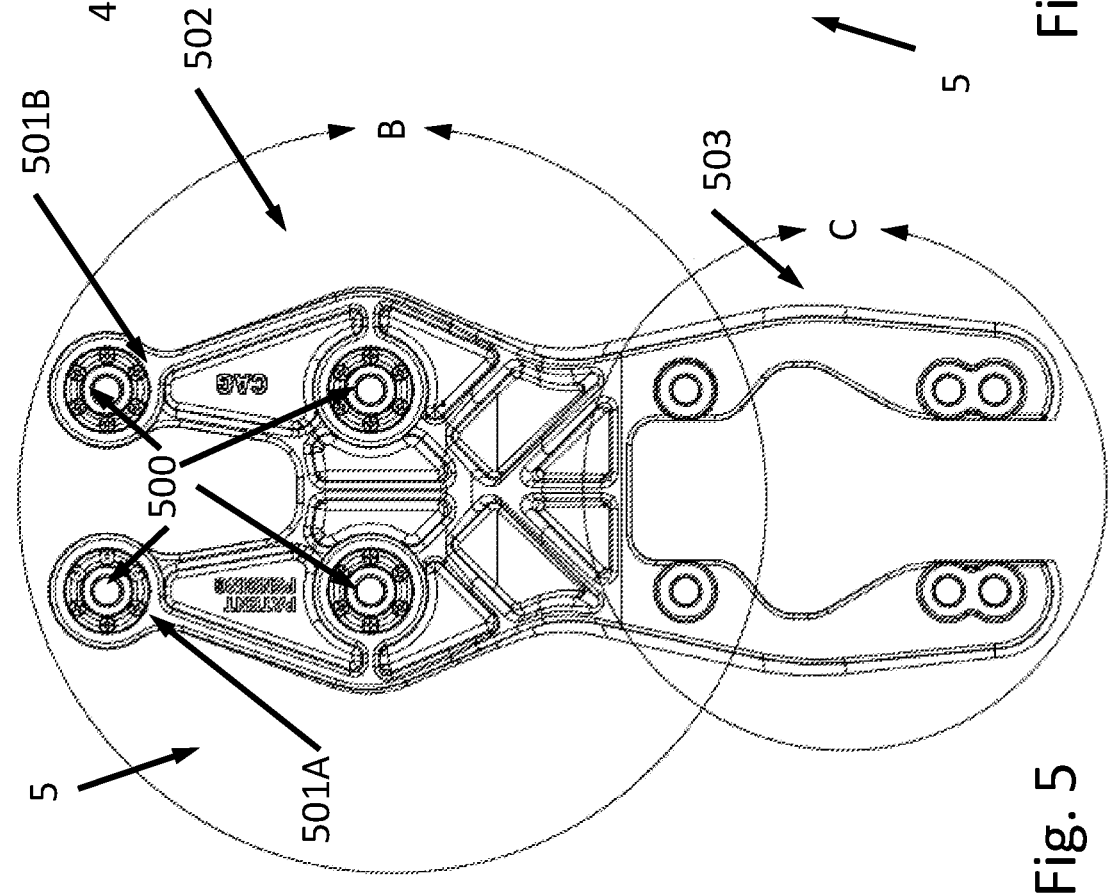
Fig. 5
Fig. 6

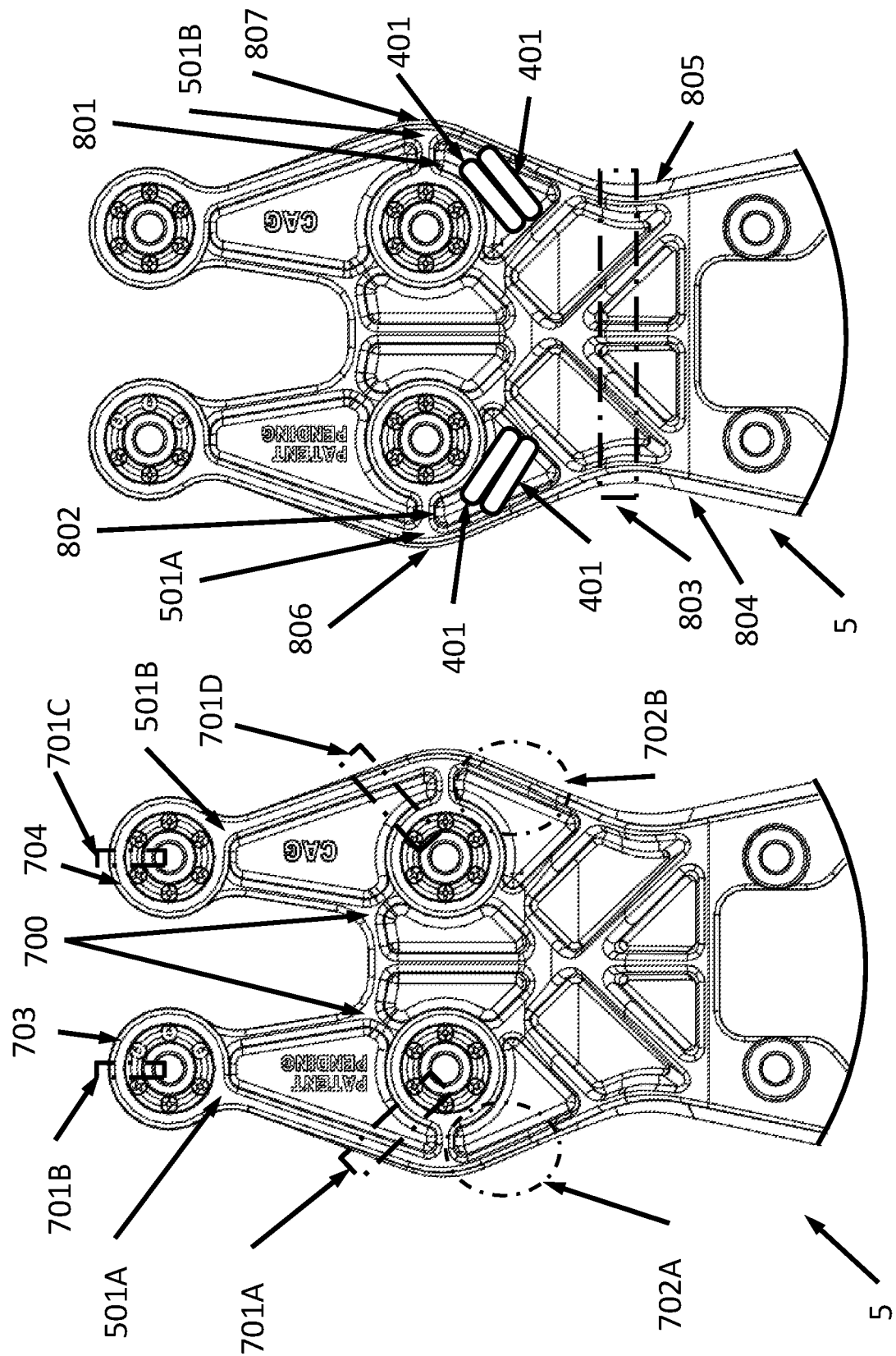

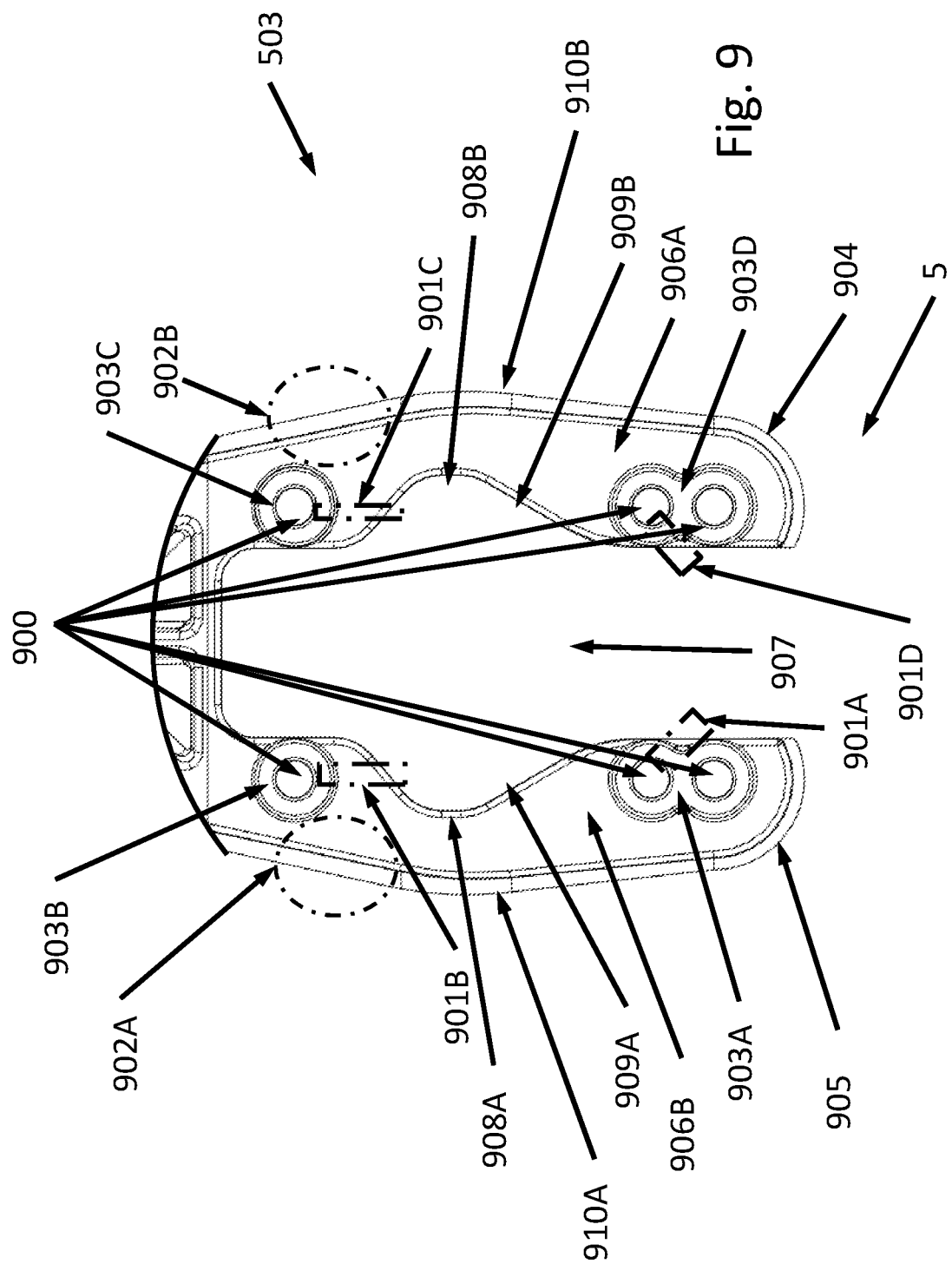

SKATEBOARD TRUCK MOUNT SKATEBOARD TRUCK MOUNT

CROSS-REFERENCE TO RELATED APPLICATIONS

Not applicable

STATEMENT REGARDING FEDERALLY SPONSORED RESEARCH OR DEVELOPMENT

Not applicable

NAMES OF PARTIES TO A JOINT RESEARCH AGREEMENT

Not applicable

BACKGROUND

The present technology is directed to skateboard truck apparatus. Skateboards have evolved into several different disciplines such as trick, to vert, to high speed downhill skating and as a form of exercise and transportation. The present apparatus may be used to permit a rider to turn more aggressively. Specifically, a property of a skateboard may include the strength of the device and turning radius. The skateboard truck may be a molded structural piece that is molded using carbon or glass fibers to increase the strength of the part. In addition, orientated fibers in molded plastic parts help to strengthen the part. However, there are several geometrical requirements when molding with fibers. These requirements are discussed in more detail below.

The present technology includes features that contribute to decreased turning radius. By decreasing the skateboard turning radius the skateboard is able to respond to operator manipulation during use. This will also be discussed in more detail below.

SUMMARY

According to some examples, the present technology is directed to a skateboard truck that is less expensive to manufacture, lightweight, high strength, and provides decreased skateboard turning radius among other advancements. In some examples, the molded skateboard truck may include geometry that is easily included when molded. For example some examples include a truck mount surface that is significantly higher than the board mount surface.

In order to manufacture a less expensive skateboard truck mount molding maybe used. However, to ensure high strength fibers are needed. Molding with fibers may be difficult as the fibers need to "flow" into the mold and remain in a desired general orientation. This may require geometric features of the mold and part.

Smaller turning radii allows for increased manipulation of the skateboard. However, decreasing the turning radius also drives geometric features of a skateboard truck.

The present technology addresses these improvements, namely a truck mount that is less expensive, lightweight, high strength, and decreased turning radius. Many other advantages are included and will be apparent.

Broadly a skateboard truck mount is disclosed. The skateboard truck mount is a structural device which connects a skateboard truck to a skateboard "base" or board. The attachment of a truck to a board effects several properties of the skateboard. These properties include rigidity, strength, weight, truck stability, and geometric wheel clearance.

In some examples, the height of the skateboard relative to the truck can determine the stability of the truck wheels and the skateboard response to twisting of the board. This twisting is typically used to cause the skateboard to turn. While twisting the board causes the wheels to move closer to the center line of the board (and the truck mount) and so to maintain clearance the truck mount needs to accommodate this movement.

In an example, the mounting of the truck to the truck mount is required to be rigid and stiff. This mounting requirement may result in an enlarged attachment area. Additionally, the truck may provide much of the structural rigidity. In some examples, a stiff truck surface may be used to transfer force from the truck to the truck mount. This may allow the truck mount to be designed geometrically to allow for alignment of fibers within a base material.

In some examples the mounting of the board to the truck mount is required to be rigid and stiff. This mounting requirement may result in an enlarged attachment area. Additionally, the board may provide much of the structural rigidity. In some examples, a stiff board surface may be used to transfer force from the board to the truck mount. This may allow the truck mount to be designed geometrically to allow for alignment of fibers within a base material.

In some examples, carbon and glass fibers are included in the base material of the truck mount. These carbon fibers increase the overall strength of the truck mount. This is a generally understood means of increasing the strength of a part, such as a plastic molded part. Elongated carbon and glass fibers may also be included.

Fibers provide some directional dependent properties when they are generally aligned with each other. For instance, aligning the fibers along a length of a part can increase stress carrying properties in the aligned direction such as yield strength and stiffness. In some examples, the truck mount may be under a bending load as the truck and the board are separated along the length of the skateboard.

In some examples, the truck mount geometry is configured to align the carbon and glass fibers such that the desired yield strength and stiffness is provided. This can include the geometry of ribs and surfaces of the truck mount. Additionally, the location of gates along the truck mount may be used to align carbon fibers.

In some examples, gate locations may be used to control weld lines volumes on the truck mount. In this context a weld line volume is a volume of the truck mount where two branches of truck mount base material engage each other as they flow through a mold. For example, during a molding process, truck mount base material may flow around both sides of a feature on the mold. This causes the truck mount base material to split along each side. As the truck mount base material continues around the feature they may engage each other. This engagement volume is a weld line volume; these weld lines volumes can be weaker than non-engaging volumes. In some examples, weld lines volumes are located in volumes of the truck mount which carry less load (e.g. force, torque, or any combination and orientation of force and torque). In some examples, a truck mount may provide additional geometry to enhance skateboard performance.

Some examples include a narrow connecting section between a truck mount area and a board mount area. This narrow connecting section reduces weight and may provide clearance for skateboard wheels during a tight turn. In some of the examples, the truck mount area and the board mount area may be extended in the outboard direction in order to reduce stress and increase leverage.

BRIEF DESCRIPTION OF THE DRAWINGS

FIG. 5 depicts a top view of a truck mount showing cross section and detail locations.

FIG. 6 depicts a section view located in FIG. 1.

FIG. 7 depicts a detail B of a board mount area shown in FIG. 5.

FIG. 8 depicts a detail B of a board mount area shown in FIG. 5.

FIG. 9 depicts a detail C of a truck mount area shown in FIG. 5.

DETAILED DESCRIPTION

Figure 1:
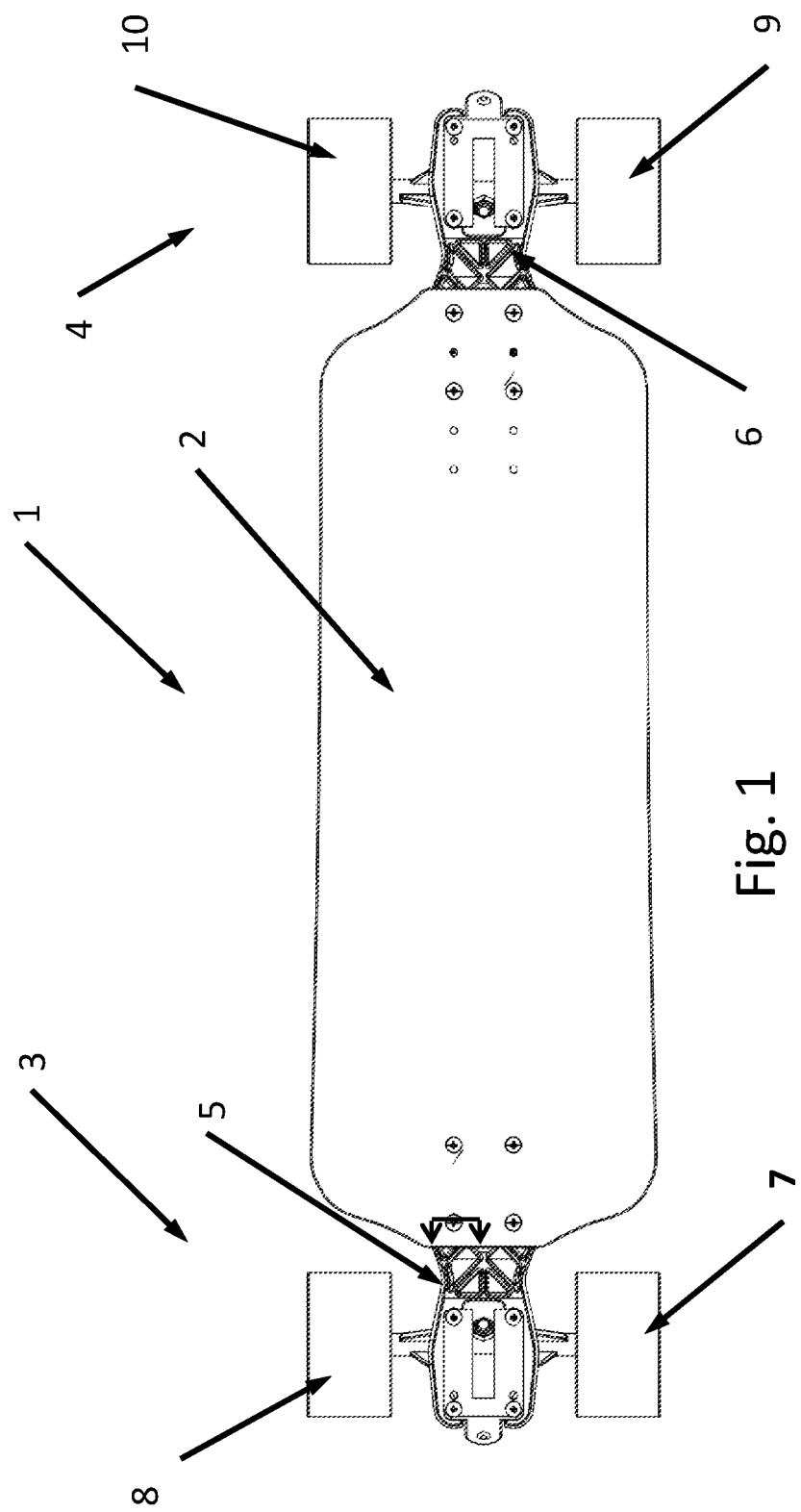
FIG. 1 depicts a top view of a skateboard having truck mounts.

Various aspects and examples of a skateboard truck mount, as well as related methods, are described below and illustrated in the associated drawings. Unless otherwise specified, a skateboard truck mount in accordance with the present teachings, and/or its various components, may contain at least one of the structures, components, functionalities, and/or variations described, illustrated, and/or incorporated herein in connections with the present teachings may be included in other similar devices and methods, include being interchangeable between disclosed examples. The following description of various examples is merely illustrative in nature and is in no way intended to limit the disclosure, its application, or uses. Additionally, the advantages provided by the examples and examples described below are illustrative in nature and not all examples and examples provide the same advantages or the same degree of advantages.

This Detailed Description includes the following section, which follow immediately below: (1) Definitions; (2) Overview; (3) Examples; (4) Advantages, Features, and Benefits; and (5) Conclusion.

Definitions

The following definitions apply herein, unless otherwise indicated.

"Comprising," "including," and "having" (and conjugations thereof) are used interchangeably to mean including but not necessarily limited to, and are open-ended terms not intended to exclude additional unrecited elements, or method steps.

Terms such as "first," "second," and "third" are used to distinguish or identify various members of a group, or the like, and are not intended to show serial or numerical limitations.

"AKA" means "also known as," and may be used to indicate an alternative or corresponding term for a given element or elements.

The terms "inboard," "outboard," "forward," "rearward," and the like are intended to be understood in the context of a host vehicle on which systems described herein may be mounted or otherwise attached. For example, "outboard" may indicate a relative position that is laterally farther from the centerline of the vehicle, or a direction that is away from the vehicle centerline. Conversely, "inboard" may indicate a direction toward the centerline, or a relative position that is closer to the centerline. Similarly, "forward" means toward the front portion of the vehicle, and "rearward" means toward the rear of the vehicle. In the absence of a host vehicle, the same directional terms may be used as if the vehicle were present. For example, even when viewed in isolation, a device may have a "forward" edge, based on the fact that the device would be installed with the edge in question facing in the direction of the front portion of the host vehicle.

"Coupled" means connected, either permanently or releasably, whether directly or indirectly through intervening components.

"Resilient" describes a material or structure configured to respond to normal operation loads (e.g. when compressed) by deforming elastically and returning to an original shape or position when unloaded.

"Rigid" describes a material or structure configured to be stiff, non-deformable, or substantially lacking in flexibility under normal operation conditions.

"Elastic" describes a material or structure configured to spontaneously resume is former shape after being stretched or compressed.

"Providing," in the context of a method, may include receiving, obtaining, purchasing, manufacturing, generating, processing, preprocessing, and/or the like, such that the object or material provided is in a state and configuration for other steps to be carried out.

"Operatively," describes a connection between two devices or entities such that a function is provided from one entity to another. For example, a first entity may be operatively connected to a second entity for transferring force. In this example, a connection between first and second entity may be by gears, a belt, solder, or weld such that force (or torque) is transferred from first entity to second entity.

"Force," and "torque," in this disclosure includes positive and negative values. For instance, force provided to object one from object two means, object one pushes or pulls on object two and/or object two pushes or pulls on object one.

"Stress," in this disclosure refers to force acting on any infinitesimal area located inside a load carrying member divided by the infinitesimal area. The direction of force relative each infinitesimal area determines the type of stress. "Tensile stress" refers to the stress acting perpendicular away from the infinitesimal area. "Compressive stress" refers to the stress acting perpendicular and into the infinitesimal area. "Shear stress" refers to the stress acting parallel to the infinitesimal area. Tensile stress in a negative direction is compressive stress. "Normal stress" refers to both tensile stress and compressive stress, for example a member may carry tensile stress or compressive stress depending on external loads. In this case the member carries normal stresses.

In this disclosure, one or more publication, patents, and/or patent application may be incorporated by reference. However, such material is only incorporated to the extent that no conflict exists between the incorporated material and the statements and drawings set forth herein. In the event of any such conflict, including any conflict in terminology, the present disclosure is controlling.

Overview

Generally, the present disclosure pertains to devices and methods for a skateboard truck mount. A skateboard truck mount is used to attach a skateboard truck to a skateboard board on which an operator is positioned. The features included in a skateboard truck mount may be influenced by it's manufacturing process.

A skateboard truck mount manufactured by molding reduces the cost of manufacturing. Truck mounts can be machined, or stamped from metal or even 3-D printed. However, these processes can be expensive. While molding parts have other limitations such as material requirements and process challenges.

EXAMPLES

Figure 2:
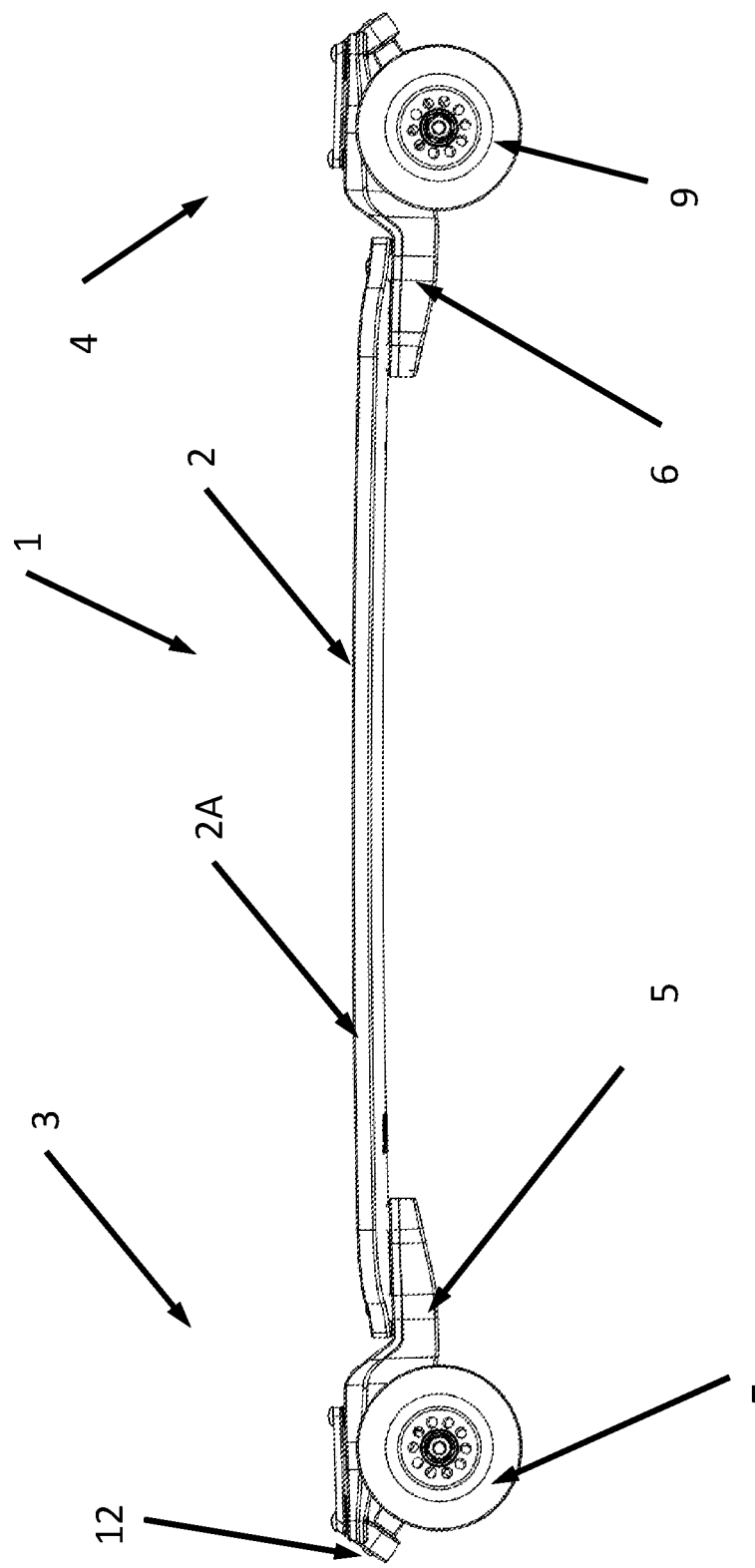
FIG. 2 depicts a side view of a skateboard having truck mounts.

FIG. 1 depicts a skateboard 1 which includes a board 2, a leading truck 3, a following truck 4, a leading truck mount 5, and a following truck mount 6. FIG. 2 depicts a side view of skateboard 1. During operation the skateboard 1 supports a user on the top surface 2A and the skateboard 1 is supported by wheels 7, 8, 9, and 10. Wheels 7, and 8 are attached to leading truck 3 and wheels 9, and 10 are attached to following truck 4. Leading truck mount 5 connects the leading truck 3 to the board 2 and following truck mount 6 connects the following truck 4 to the board 2. In some examples, the leading truck mount 5 and following truck mount 6 are identical, however in other examples, leading truck mount 5 and following truck mount 6 are not identical. In yet other examples, skateboard 1 may include only leading truck mount 5 or only following truck mount 6. Truck mounts 5 and 6 may include several features.

Figure 3:
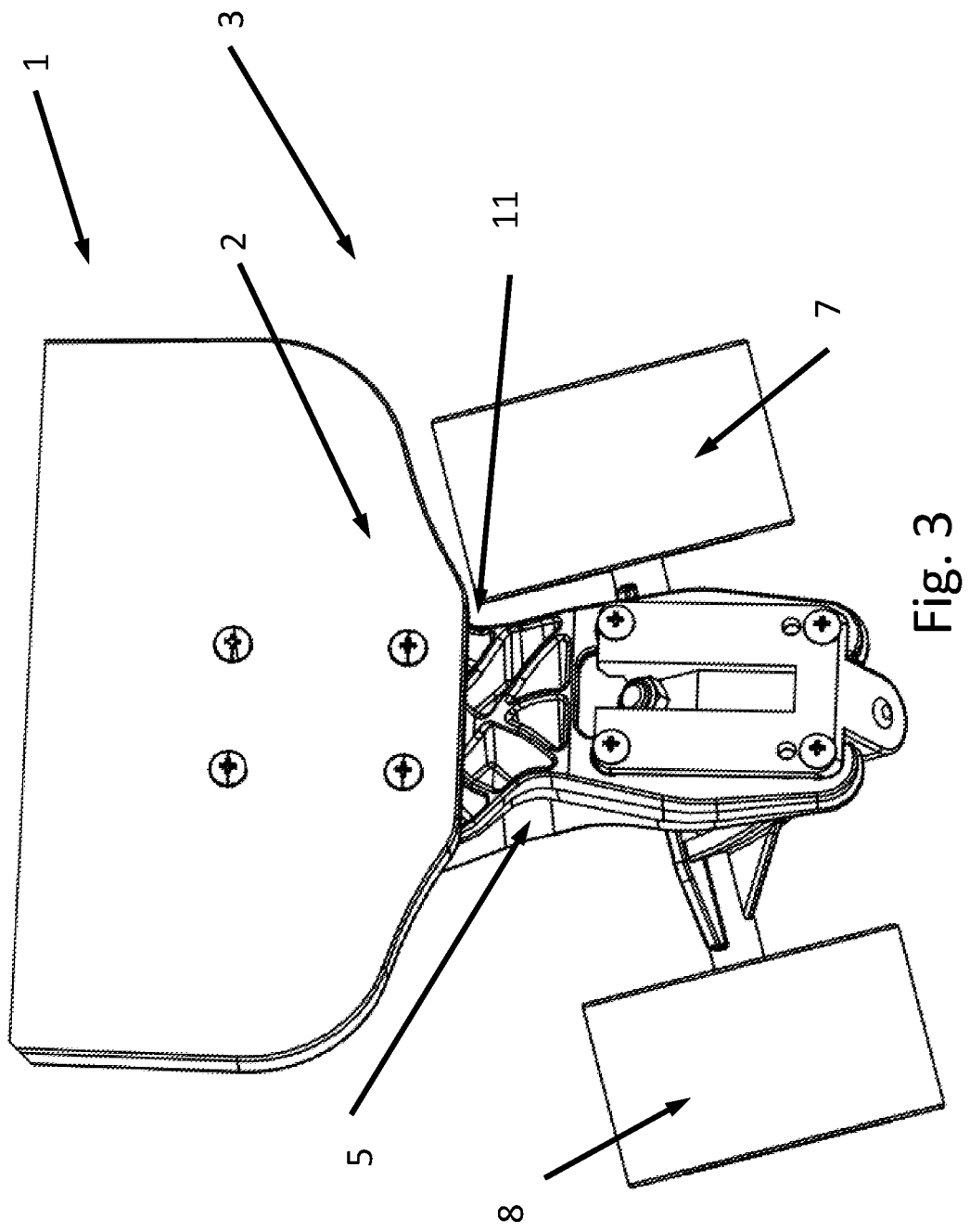
FIG. 3 depicts a partial top view of a turning skateboard having a truck mount.

FIG. 3 depicts the leading truck 3 of skateboard 1 with board 2 tilted. This causes the leading truck 3 to turn wheels 7 and 8. During a turning operation a wheel moves toward a truck mount. For example, in FIG. 3 wheel 7 moves toward leading truck mount 5. This move reduces clearance 11 between wheel 7 and the leading truck mount 5. In some examples, leading truck mount 5 includes a feature to maintain clearance 11 during a turning operation. Board 2 may be attached to leading truck mount 5 directly or indirectly.

Figure 4:
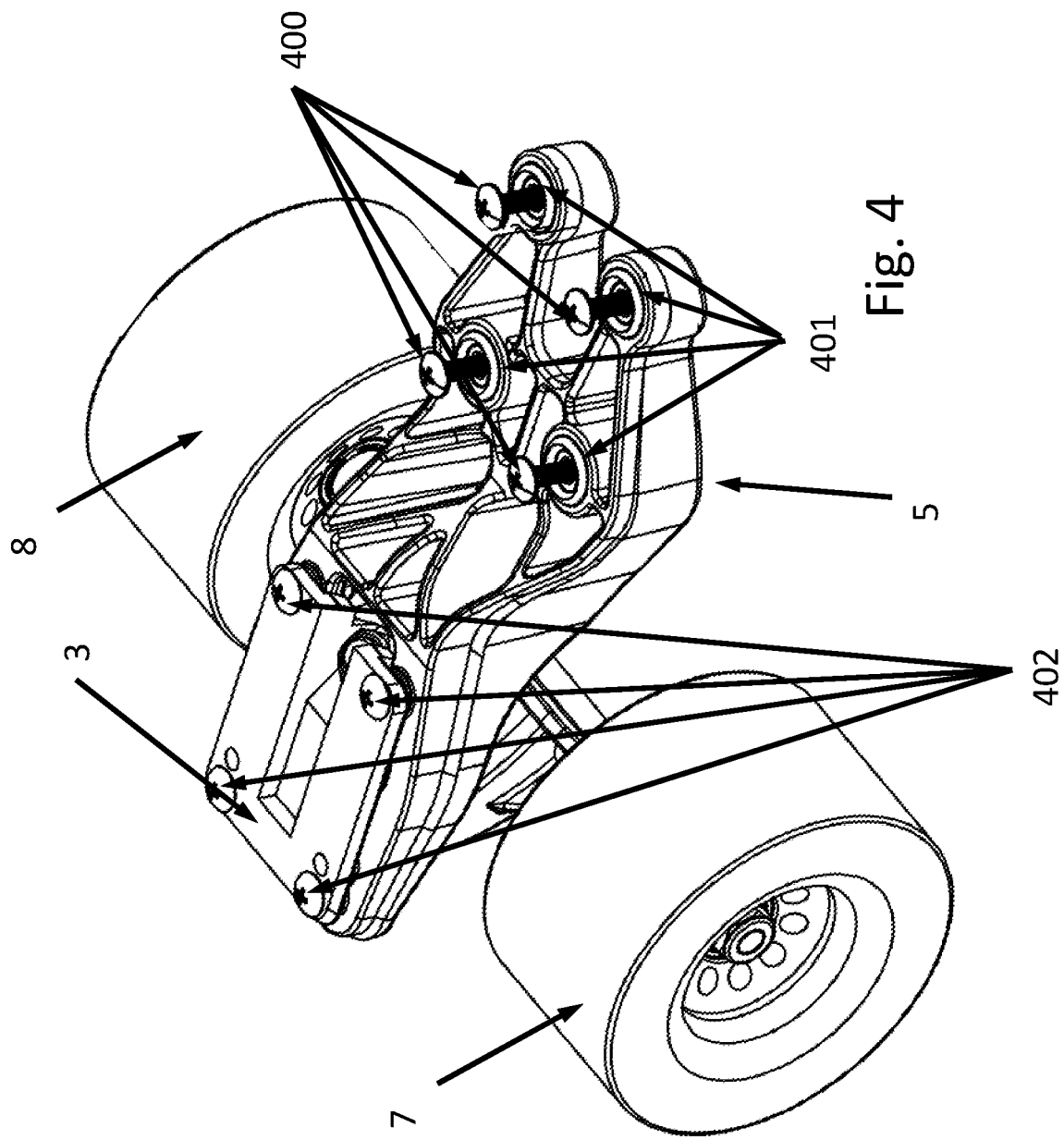
FIG. 4 depicts an isometric view of a truck mount with a truck attached.

FIG. 4 depicts leading truck 3 without board 2 shown. Mounting screws 400 may be used to attach board 2 (not shown) to leading truck mount 5. In this example screws 400 are used, however any means of attaching board 2 to leading truck mount 5 may be used such as cams, rivets, and threaded rods and plates. Mounting screws 402 may be used to attach leading truck 3 to leading truck mount 5. In this examples screws 402 are used, however any means of attaching leading truck 3 to leading truck mount 5 may be used such as cams, rivets, and treaded rods and plates. Leading truck mount 5 may include features to receive attachment devices.

FIGS. 4-8 depict various features of board mount area 502 of leading truck mount 5. The leading truck mount 5 includes holes 500 these holes may receive screws 400. Surrounding holes 500 are stabilizers 401 are located such that they protrude above mounting surfaces 501A and 501B. Mounting board 2 to the leading truck mount 5 causes the stabilizers 401 to compress. In some examples, stabilizers 401 may be compressed flush with mounting surfaces 501A and 501B. Compressing stabilizers 401 has the effect of reducing noise as the surfaces 501A and 501B move relative to board 2 during use. In some examples stabilizers 401 may be located in leading truck mount 5.

In some examples, each hole 500 is surrounded by a groove 600 (refer to FIG. 6.). Groove 600 includes bottom groove surface 601, inner groove surface 602, and outer groove surface 603. Groove 600 may be used to hold stabilizers 401. Stabilizers 401 may engage inner groove surface 602 causing them to remain stationary relative to the leading truck mount 5. This may provide for better noise reduction. Stabilizers 401 may have a variety of cross sectional shapes.

Stabilizers 401 are shown to have a round cross sectional shapes. In some examples, stabilizers 401 may have rectangular, star shaped, oval shaped, or even dish shaped cross sectional geometry. Stabilizers of various cross sectional geometry may provide specific benefits such as noise reduction. In some examples features may be added to protect board 2 mounting hardware.

FIG. 6 is a cross section of an example of a board mounting assembly. Leading truck mount 5 may include a pocket 604 which surrounds nut 605. Nut 605 may be threadedly attached to screw 402. Counter bore 604 surrounds nut 605 with counter bore rib 606. During use counter bore 604 protects nut 605 from damage by uneven ground. Additionally, counter bore 604 may protect threads on the end of screw 402. Leading truck mount 5 may include a board mounting area 502 and a truck mounting area 503.

FIG. 5 depicts the location of two detail figures. Specifically, detail B is depicted in FIGS. 7 and 8, and detail C is depicted in FIG. 8. Board mounting area 502 may include several features.

Board mounting surfaces 501A and 501B (which may be a single large surface) may be surfaces that engage the bottom of board 2. Board mounting surfaces 501A and 502B surrounds each of the holes 5, board mounting surfaces 501A and 501B may provide load bearing surfaces that interface with the board 2 such that the loading on the leading truck mount 5 will be limited to this area. This may be used to better predict and support loads during use. A lowered surface 700 may be included in the board mounting area 502.

In some examples, a lowered surface 700 may be included in the board mounting area 502. Lowered surface 700 may be located below board mounting surfaces 501A and 501B. Having lowered surface 700 lower than board mounting surfaces 501A and 501B assures that debris and fluids that may get inside the volume between board 2 and leading truck mount 5 can escape due to lower surface 700 creating an open area. In some examples holes may be added to allow debris to escape, however this reduces the strength of leading truck mount 5. Additionally, lowered surface 700 may eliminate unpredicted loading on the leading truck 5 during use. For example, if lowered surface 700 and board mounting surfaces 501A and 501B are all the same surface, any manufacturing errors that cause lowered surface 700 to be engaging board 2 may cause board mounting surfaces 501A and 501B to not correctly interface with board 2. Board mount fork members 703 and 704 may also be included in board mount area 502.

In some examples, board mounting area 502 may include two board mount fork members 703 and 704. During a molding process the forming of each board mount fork members 703 and 704 may be configured to locate board mounting weld lines volumes 701A, 701B, 701C, and 701D away from board mounting high stress volumes 702A, and 702B. Board mount fork members 703 and 704 may provide additional advantages.

In some examples, board mount fork members 703 and 704 allow some flexibility during assembly. Holes 500 may not align correctly with holes on board 2. Board mount fork members 703 and 704 may add some flexibility such that the holes 500 can be aligned with holes on board 2 during assembly. Some additional features of the board mount area 502 may be used for shipping and handling processes.

FIG. 8 depicts detail B of FIG. 5 with stabilizers 401 inserted into stabilizer pockets 801 and 802. In some examples, stabilizer pockets 801 and 802 are configured to hold stabilizers 401 in place for storage and/or packaging. Board mount area 502 may include additional features.

In some examples, board mount area 502 may include widening surfaces 806 and 807. Widening surfaces 806 and 807 extend the board mounting surfaces 501A and 501B in an outboard direction. During turning operations the leading truck mount 5 is twisted by the board 2 as it is tilted. Twisting causes torque on the leading truck mount 5. Widening the board mount surfaces 501A and 501B allows for extra leverage and decreases the stress in the leading truck mount 5. A narrow connecting volume 803 may be used to attach board mount area 502 to truck mount area 503.

FIG. 8 depicts a narrow connecting volume 803. In some examples, this narrow connecting volume 803 connects the board mounting area 502 with the truck mount area 503. Narrow surfaces 804 and 805 may provide clearance 11 (shown in FIG. 3) for leading truck wheels 7 and 8. Narrow connecting area 803 may also locate board mount area 502 and truck mount area 503 relative to each other.

In some examples, mounting surfaces 501A and 501B are located below truck mount surfaces 903A, 903B, 903C, and 903D. Narrow connecting area 803 may be used to establish the vertical location of mounting surfaces 501A and 501B and truck mount surfaces 903A, 903B, 903C, and 903D. In some examples, locating the board 2 at approximately the same height as turning pivot 12 (best shown in FIG. 2) adds stability during use. In some examples, mounting surfaces 501A and 501B and truck mount surfaces 903A, 903B, 903C, and 903D are parallel however in other examples these areas may be angled relative to each other. Angling these surfaces may be desired as this affects the turning characteristics of the leading truck 3. Narrow connecting area 803 may be adjacent to the truck mount area 503.

Figure 10:
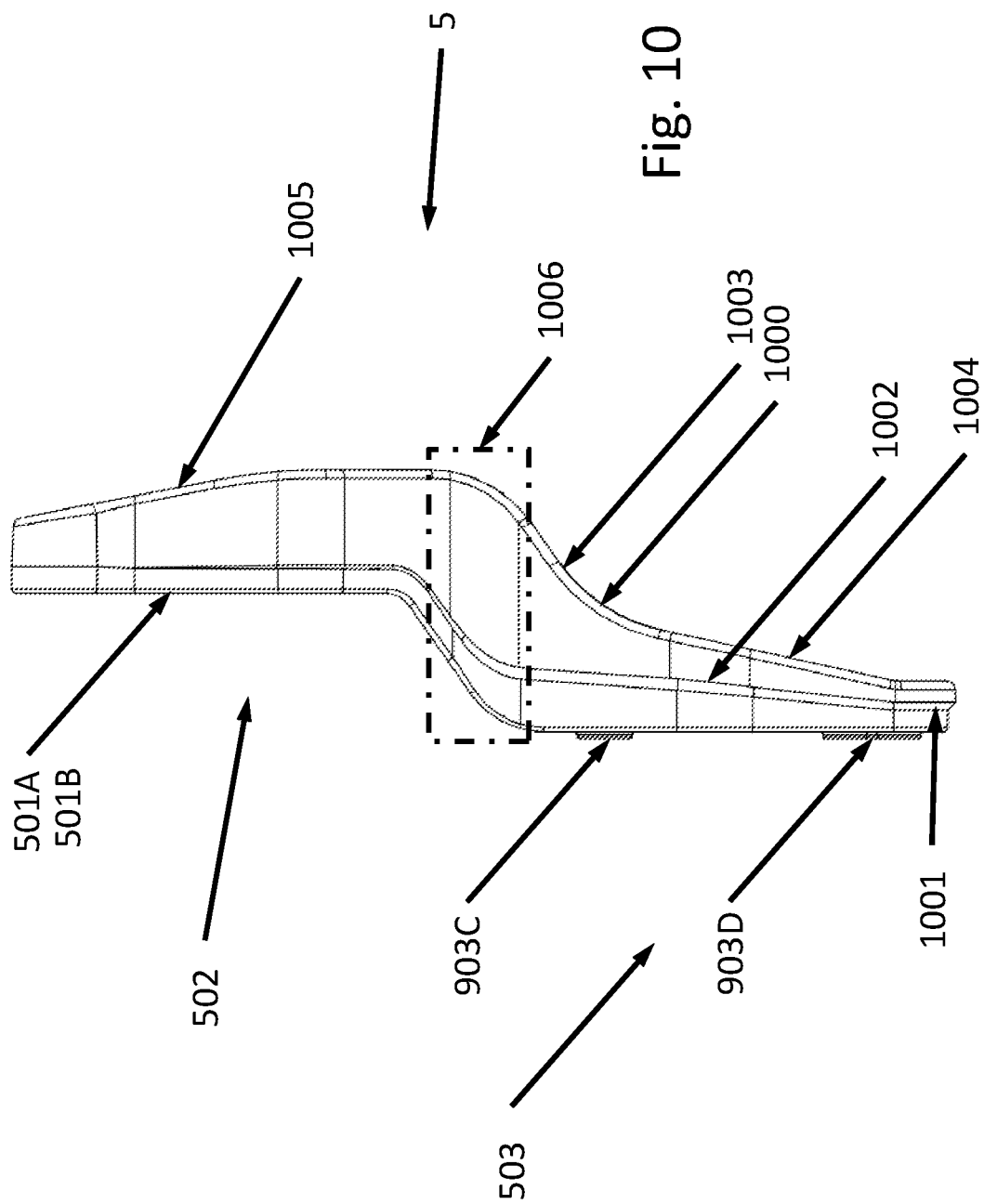
FIG. 10 depicts a side view of a truck mount.
Figure 11:
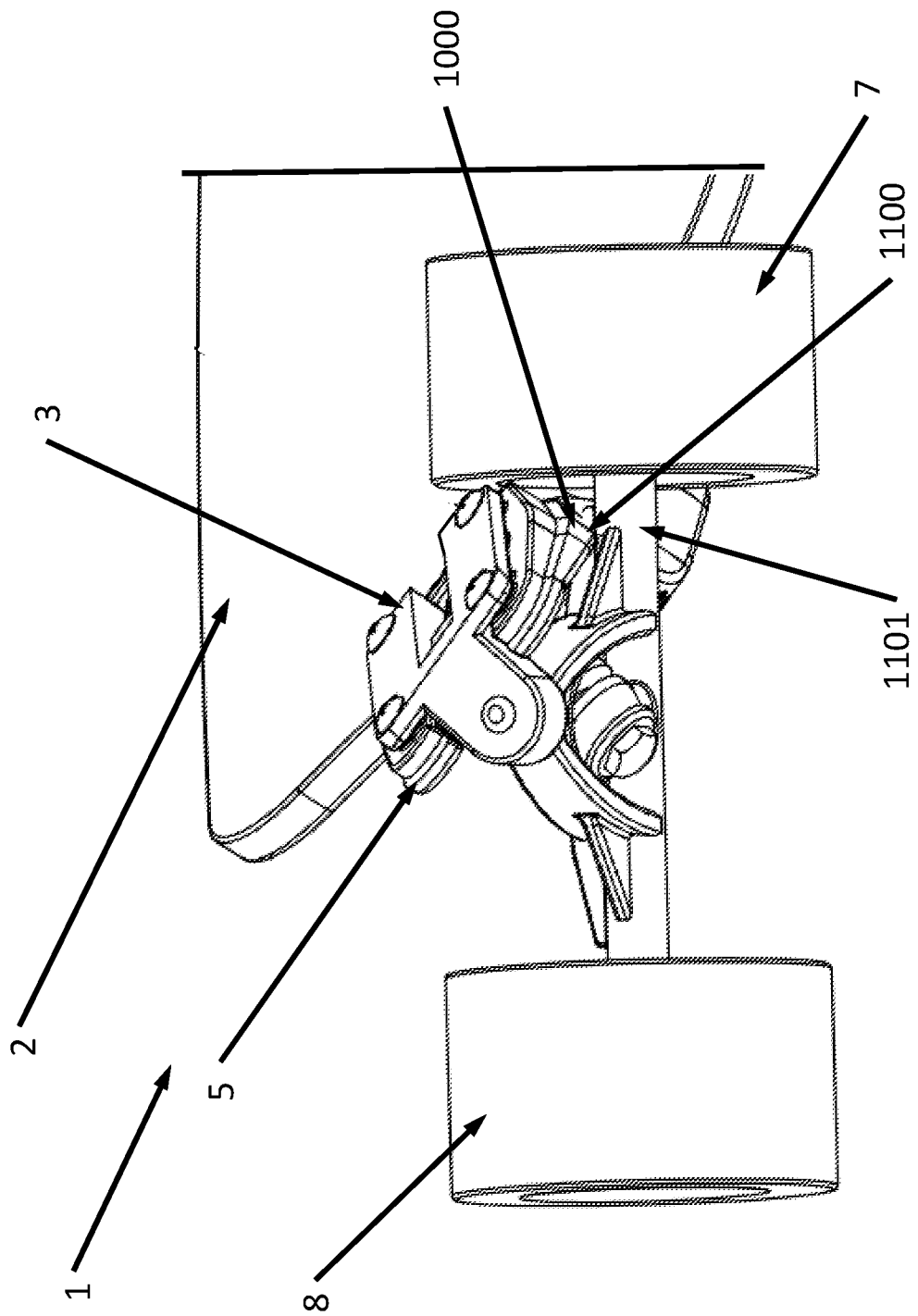
FIG. 11 depicts a partial front view of a skateboard having a truck mount turned completely into a stop.

FIGS. 9-11 depict various features of truck mount area 503 of leading truck mount 5. Truck mount area 503 includes holes 900 which receive screws 402. Holes 900 may be surrounded by raised truck mount surfaces 903A, 903B, 903C, and 903D. Truck mount surfaces 903A, 903B, 903C, and 903D determine the vertical location of board 2 relative to the ground. This vertical location of board top 2A relative to truck mount surfaces 903A, 903B, 903C, and 903D provides for stability during use. Commercial leading trucks may include raised lettering which could compromise the mounting. Truck mount surfaces 903A, 903B, 903C, and 903D provide clearance between leading truck 3 and clearance surfaces 906A, and 906B. Additional features may be included in truck mount area 503.

In some examples, truck mounting area 503 may include two truck mount fork members 904 and 905. Truck mount fork members 904 and 905 may be configured to locate truck mounting weld line volumes 901A, 901B, 901C, and 901D away from truck mounting high stress volumes 902A, and 902B during a molding process. Truck mount fork members 904 and 905 may provide other advantages.

In some examples truck mount fork members 904 and 905 provide flexibility during assembly. In some examples shrinkage or other manufacturing errors can occur. These manufacturing errors may prevent alignment of features on the truck mounting area 503 with features on the truck 3. For example, holes 900 may not align correctly with holes on truck 3. Truck mount fork members 904 and 905 may add some flexibility such that the holes 900 can be aligned with holes on truck 3 during assembly. Leading truck mount 5 may include a stop feature.

FIG. 10 depicts a side view of an example of leading truck mount 5. In some examples stop rib 1000 acts as a stop for the leading truck tilting motion. FIG. 11 depicts an approximate partial front view of turning skateboard 1. Stop rib 1000 contacts the hanger 1101 of leading truck 5 at stop area 1100. In this example stop rib 1000 and hanger 1101 may be sized to establish a maximum skateboard 1 tilt. This stop rib 1000 may be used to prevent wheels 7 and 8 from engaging the leading truck mount 5 and/or the board 2. This engagement could cause unpredictable and unsafe performance such as "wheel bite". In a molded example, stop rib 1000 may include a continuous skin 1003. Continuous skin 1003 has added stress carrying properties which provide for a stronger part.

In some examples, the narrow connecting area 803 includes deep structural area 1006. This deep structural area provides for carrying a large bending moment created during use. Truck mount surfaces 903A, 903B, 903C, and 903D receive load during use from the leading truck 3. This load is transferred through deep structural area 1006 and to the board mount area 502. Truck mount area 503 may include weight reduction features.

In some examples, leading truck mount 5 includes a truck mount area tapered profile 1004. Truck mount area tapered profile 1004 decreases the weight of the leading truck mount 5 as the stress along the truck mount area tapered profile 1004 decreases. The board mount area may also be tapered.

In some examples, leading truck mount 5 includes a board mount area tapered profile 1005. Board mount area tapered profile 1005 decreases the weight of the leading truck mount 5 as the stress along the board mount area tapered profile 1005 decreases. Leading truck mount 5 may include truck clearance features as well.

In some examples, truck clearance area 907 is located between truck mount fork members 904 and 905. Truck clearance area 907 allows truck 3 to be mounted on truck mount surfaces 903A, 903B, 903C, and 903D and extend through the leading truck mount 5. Mounting leading truck 3 in this manner allows clearance for hanger 1101 to pivot during a turning operation. Truck clearance area 907 may include inboard clearance surfaces 908A, 908B, 909A, and 909B. FIG. 9 depicts inboard clearance surfaces 908A and 908B, and 909A and 909B as being symmetric; this symmetry is not required for any examples. Truck mount area 503 may include structural features.

In some examples, truck mount area 503 may include outward extending surfaces 910A and 910B which establish the material of leading truck mount 5 adjacent to truck clearance area 907. Outward extending surfaces 910A and 910B provide strength to leading truck mount 5 adjacent to truck clearance area 907. FIG. 9 depicts outward extending surfaces 910A and 910B as being symmetric; this symmetry is not required for any examples. Leading truck mount 5 may include features that reduce sharp edges during molding.

In some examples, leading truck mount 5 may include a parting line 1002 (shown in FIG. 10). Parting line 1002 is a feature that is produced during a molding process. Parting line 1002 is located where at least two halves of the molding tool comes into contact during the molding process. Parting feature 1001 is an angled surface adjacent to parting line 1002. The applicant has found that parting feature 1001 eliminates sharp edges that can form at part line 1002. The molding process also allows additional safety features.

Safety features may be added to the leading truck mount 5 by including lights for visibility and/or features for mounting a brake. Molding features may be added to leading truck mount 5 to increase strength.

Figure 12:
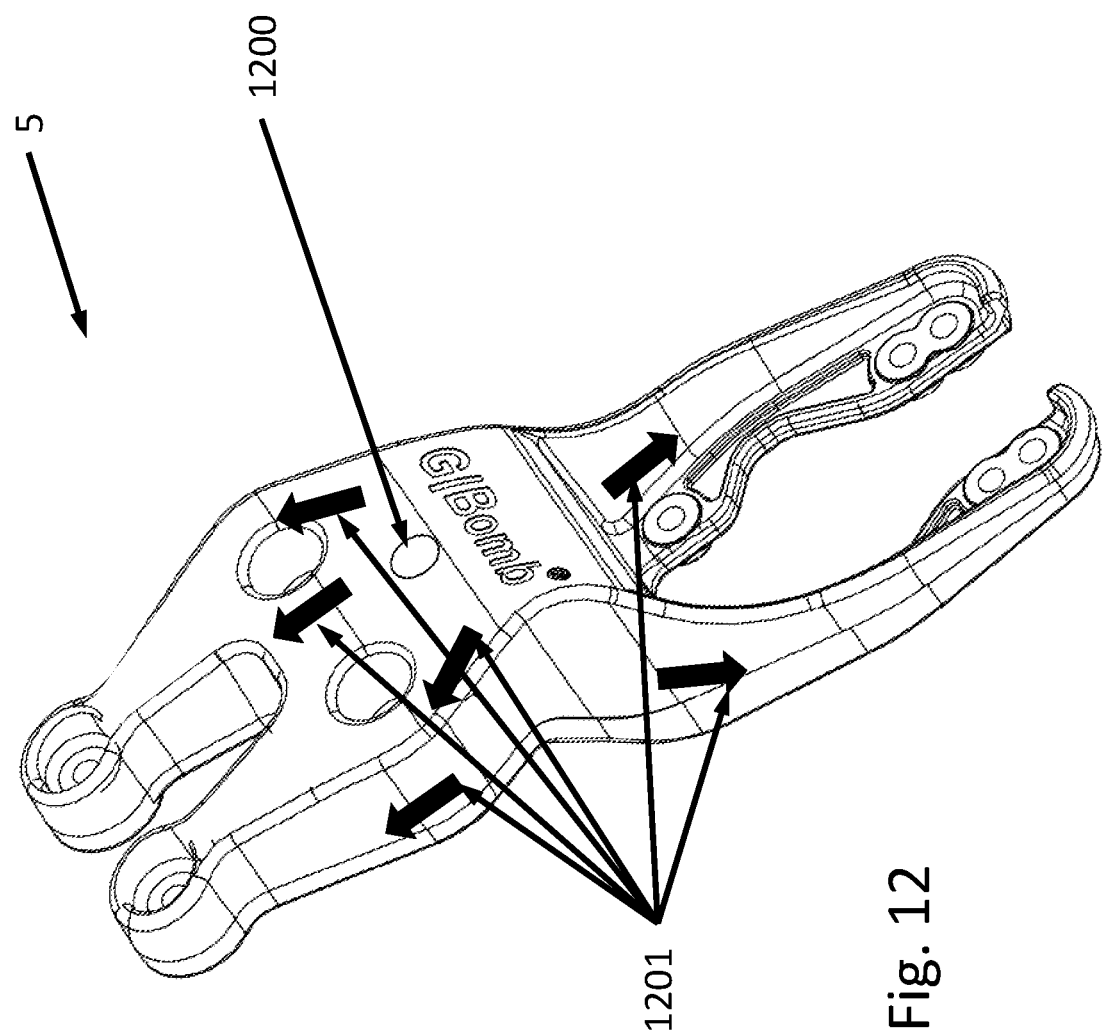
FIG. 12 depicts an isometric bottom view of a truck mount.
Figure 13:
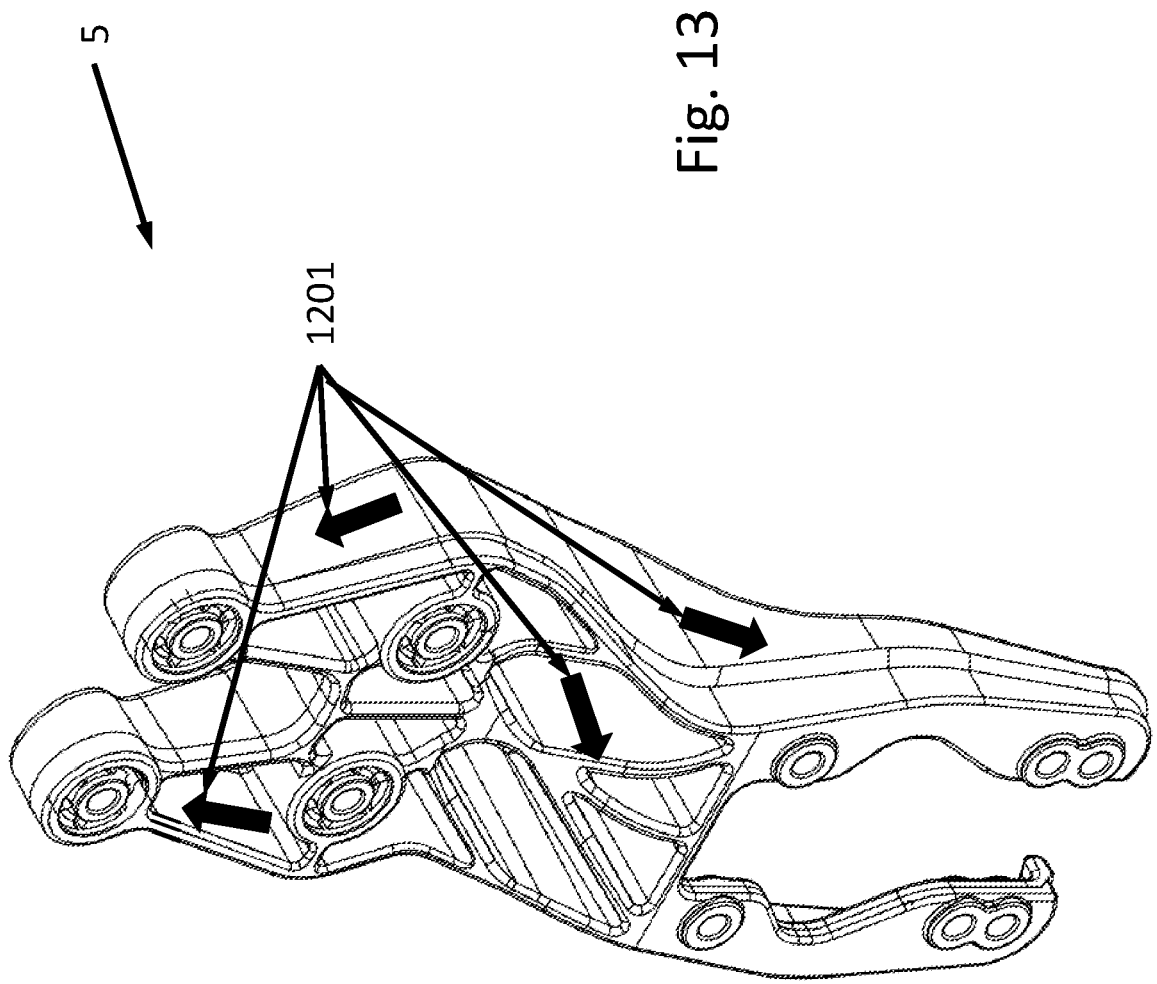
FIG. 13 depicts an isometric top view of a truck mount.

FIG. 12 depicts gate location 1200. Gate location 1200 approximately located at the center of leading truck mount 5. Arrows 1201 depict the direction of material as leading truck mount 5 is molded. In some examples, gate location 1200 determines weld lines volumes 701A, 701B, 701C, 701D, 901A, 901B, 901C, and 901D. The truck mount geometry including gate location 1200, widening surfaces 806 and 807, narrow volume 803, board mount fork members 703 and 704, and truck mount fork members 904 and 906 act to influence the location of weld line volumes 701A, 701B, 701C, 701D, 901A, 901B, 901C, and 901D. Leading truck mount may include fibers as a means of increasing strength. Positioning weld lines in low stress areas eliminates costly post processing of parts to add features such as holes.

In some examples, fibers are added to the base material used to mold leading truck mount 5. The applicant has found that fibers as long as 12 millimeters may be included. Fibers such as carbon and/or glass may be used to increase the strength of leading truck mount 5. However, carbon or glass fibers need to be orientated along the direction of stress of the leading truck mount 5 in order to provide the most strength. These fibers tend to orient along the direction of flow of the base material during a molding process. Gate location 1200 and leading truck mount 5 features are important factors of fiber orientation. In some examples, gate location 1200 and truck mount geometry play a role in elongated fiber alignment. For instance gate location 1200, widening surfaces 806 and 807, narrow volume 803, board mount fork members 703 and 704, and truck mount fork members 904 and 906 act to orient fibers. In other examples, any combination of gate location 1200, widening surfaces 806 and 807, narrow connecting volume 803, board mount fork members 703 and 704, and truck mount fork members 904 and 906 act to orient fibers. Aligned fibers may affect the stress carrying properties of leading truck mount 5.

In some examples, the fibers are oriented using leading truck mount 5 features along the direction of normal stress acting on leading truck mount 5 during use. Strength is provided to leading truck mount 5 by configuring leading truck mount 5 using features of leading truck mount 5 and gate location 1200. Leading truck mount 5 may include additional mounting features.

Figure 15:
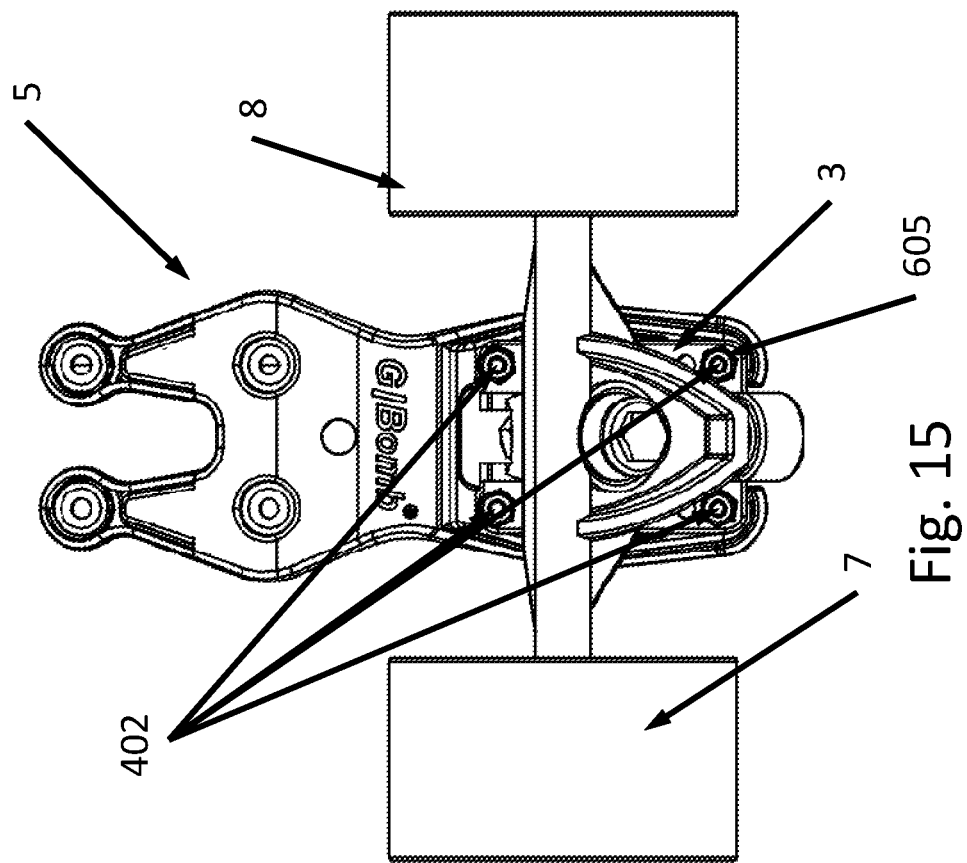
FIG. 15 depicts a bottom view of a truck mounted to the underside of a truck mount.
Figure 14:
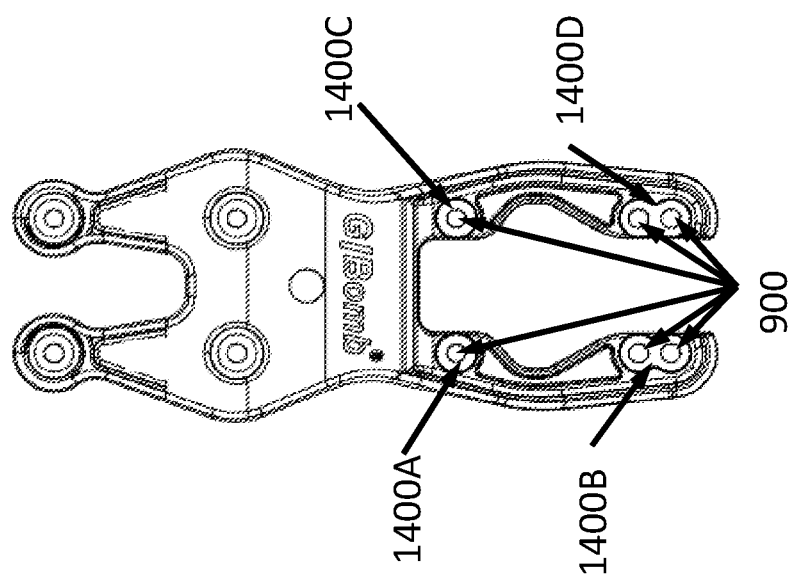
FIG. 14 depicts a bottom view of a truck mount.

Leading truck mount 5 may include features for mounting leading truck 3 on the underside of leading truck mount 5. FIG. 14 depicts underside truck mount surfaces 1400A, 1400B, 1400C, and 1400D surrounding truck mount holes 900. In the depicted example, the underside truck mount surfaces 1400A, 1400B, 1400C and 1400D are similar in geometry to the truck mount surfaces 903A, 903B, 903C, and 903D, but it not a requirement of the underside truck mount surfaces. FIG. 15 shows the leading truck 3 mounted to the underside truck mount surfaces.

Advantages, Features, and Benefits

The different examples and examples of the skateboard truck mount described herein provide several advantages over know solutions for connecting a truck to a skateboard board. For example, illustrative examples and examples described herein allow clearance between skateboard wheels and the skateboard truck mount. The features that allow for this clearance may include weld locating features that position weld line volumes away from higher stress areas. In turn these weld locating features may include features that align elongated fibers such that the skateboard truck mount strength is increased.

Additionally, and among other benefits, illustrative examples described herein allow easier assembly of the skateboard truck mount into a skateboard. This may be provided by flexible truck mount fork members, and flexible board mount fork members.

Additionally, and among other benefits, illustrative examples described herein provide a means of stopping a turning skateboard from catching wheels against the skateboard truck mount or the skateboard board. This catching of the wheels can cause unpredictable and unsafe performance of the skateboard.

Additionally, and among other benefits, illustrative examples described herein provide pockets for storage of stabilizers during storage.

Additionally, and among other benefits, illustrative examples described herein provide vertical location of the skateboard board at approximately the same height as the turning pivot of the truck. This vertical location increases stability of the skateboard.

Conclusion

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary examples were chosen and described in order to best explain the principles of the present technology and its practical application, and to enable others of ordinary skill in the art to understand the present technology for various examples with various modifications as are suited to the particular use contemplated.

In the above description, for purposes of explanation and not limitation, specific details are set forth, such as particular examples, procedures, techniques, etc. in order to provide a thorough understanding of the present invention. However, it will be apparent to one skilled in the art that the present invention may be practiced in other examples that depart from these specific details.

Reference throughout this specification to "one example" or "an example" means that a particular feature, structure, or characteristic described in connection with the examples is included in at least one examples of the present invention. Thus, the appearances of the phrases "in one examples" or "in an examples" or "according to one example" (or other phrases having similar import) at various places throughout this specification are not necessarily all referring to the same examples. Furthermore, the particular features, structures, or characteristics may be combined in any suitable manner in one or more examples. Furthermore, depending on the context of discussion herein, a singular term may include its plural forms and a plural term may include its singular form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

I claim:

1. A skateboard truck mount comprising;
   a board mount area configured to mount a skateboard board, and
   a truck mount area vertically offset from the board mount area configured to mount a skateboard truck, wherein the truck mount area and the board mount area are connected by a narrow connecting volume configured to clear a wheel of the skateboard during a turning operation, and
   a stop rib configured to limit a tilting motion of a skateboard truck.

2. The skateboard truck mount of claim 1, further comprising
   a base material configured to be molded, and
   fibers included in the base material configured to be molded with the base material.

3. The skateboard truck mount of claim 1, wherein the truck mount area and the board mount area are parallel.

4. The skateboard truck mount of claim 1, wherein board mount area includes a hole having a top end and a hole bottom end opposite the top end, configured to mount the skateboard board, wherein the hole top end is surrounded by a groove configured to locate a stabilizer.

5. The skateboard truck mount of claim 4, wherein the hole bottom end includes a counter bore configured to protect a fastener inserted into the hole.

6. The skateboard truck mount of claim 1, further comprising a pocket for storage of at least one stabilizer.

7. The skateboard truck mount of claim 2, wherein the skateboard truck mount geometry is configured to locate weld line volumes caused by a molding process, and high stress volumes caused during skateboard use, do not overlap.

8. The skateboard truck mount of claim 7, wherein the board mount area includes at least one fork member configured to locate at least one weld line volume.

9. The skateboard truck mount of claim 7, wherein the truck mount area includes at least one fork member configured to locate at least one weld line volume.

10. The skateboard truck mount of claim 1, wherein the truck mount area includes a truck clearance area configured to allow the skateboard truck to extend through the truck mount area.

11. The skateboard truck mount of claim 1, further comprising an underside truck mount area configured to mount a truck on an underside of the skateboard truck mount.

12. A method of manufacturing a skateboard truck mount, wherein the skateboard truck mount comprises;
   a board mount area configured to mount a skateboard board, and
   a truck mount area vertically offset from the board mount area configured to mount a skateboard truck, and
   a stop rib configured to limit a tilting motion of a skateboard truck
   the method comprising,
   mixing base material with fibers,
   molding the skateboard truck mount in a mold tool configured to assure that weld line volumes and high stress volumes caused during skateboard use do not overlap.

13. A skateboard truck mount comprising;
   a board mount area configured to mount a skateboard board wherein, the board mount area includes, a plurality of holes configured to mount the skateboard board, and
   a truck mount area configured to mount a skateboard truck, wherein the truck mount area includes, a stop rib configured to limit a tilting motion of a skateboard truck, wherein the truck mount area and the board mount area are connected by a narrow connecting volume configured to clear a wheel of the skateboard during a turning operation.

14. The skateboard truck mount of claim 13, wherein at least one of the holes is surrounded by a groove configured to locate a stabilizer.

15. The skateboard truck mount of claim 13, having a narrow connecting volume configured to connect the truck mount area to the board mount area and further configured to clear a wheel of the skateboard during a turning operation.

16. The skateboard truck mount of claim 13, wherein the truck mount area includes;
   at least one raised truck mount surface, and
   at least one clearance surface configured to allow clearance for a truck mounted to the at least one raised truck mount surface.

17. The skateboard truck mount of claim 13, wherein the truck mount area includes a plurality of holes configured to mount the skateboard truck.

18. The skateboard truck mount of claim 16, wherein the at least one raised truck mount surface includes at least one of the plurality of holes configure to mount the skateboard truck.

19. The skateboard truck mount of claim 2, further comprising;
   a parting line caused by a molding process, and
   a parting feature adjacent to the parting line configured to inhibit a sharp edge along the parting line.

* * * * *